(No Model.)
H. M. ALTICK.
CAMERA.
No. 422,686.  Patented Mar. 4, 1890.
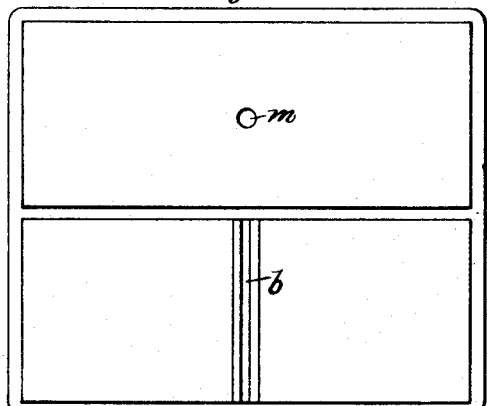
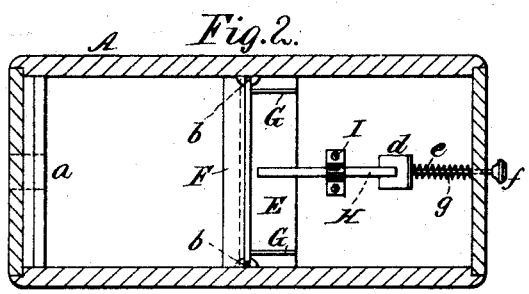
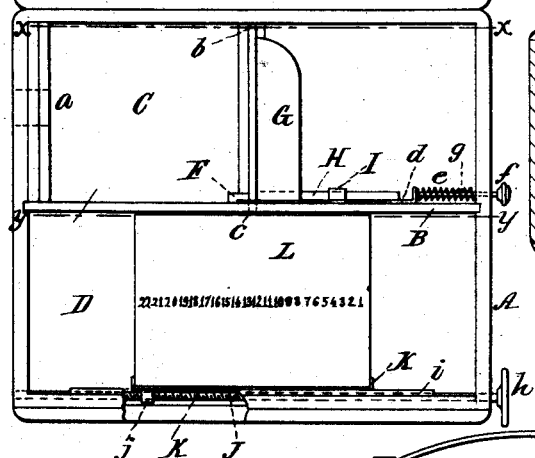
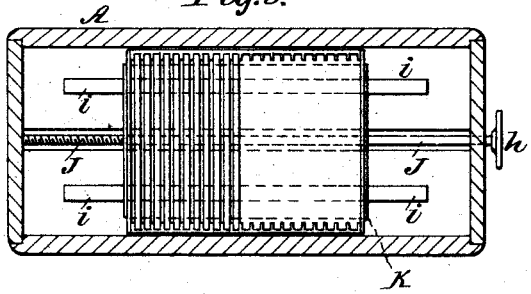
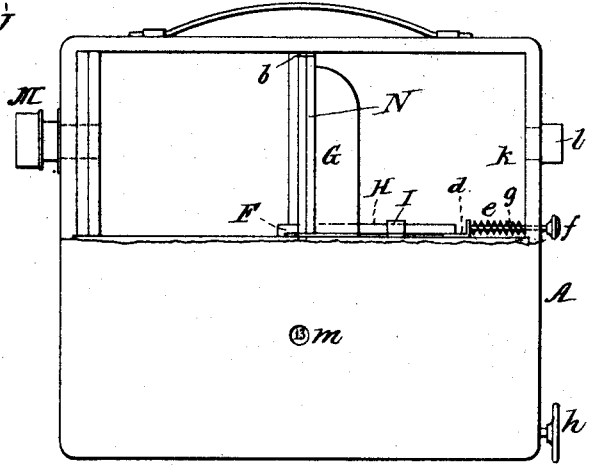
Witnesses:
W. C. Jirdinston.
Charles Billon
Inventor:
Harry M Altick
by Peck & Rector
his Attorneys.

UNITED STATES PATENT OFFICE.

HARRY M. ALTICK, OF DAYTON, OHIO.

CAMERA.

SPECIFICATION forming part of Letters Patent No. 422,686, dated March 4, 1890.

Application filed August 15, 1889. Serial No. 320,796. (No model.)

*To all whom it may concern:*

Be it known that I, HARRY M. ALTICK, a citizen of the United States, residing at Dayton, in the county of Montgomery and State of Ohio, have invented certain new and useful Improvements in Cameras, of which the following is a full, clear, and exact description, reference being had to the accompanying drawings.

My invention relates to all classes of cameras; and it has for its object the improved construction of the box for successively taking a number of pictures without exposing the plates to the light except when taking the picture.

The novelty of my invention will be hereinafter set forth, and specifically pointed out in the claims.

In the accompanying drawings, Figure 1 is an elevation, partly in section, of a camera embodying my invention and with the hinged side raised to show the interior. Fig. 2 is a sectional plan view through the dotted line $x$ $x$ of Fig. 1. Fig. 3 is a sectional plan view through the dotted line $y$ $y$ of Fig. 1. Fig. 4 is an elevation of a camera embodying a modification of my invention and with the upper half of one side broken away to show the interior.

The same letters of reference are used to indicate identical parts in all the figures.

I provide a rectangular box A, which is divided horizontally by a partition B into two equal compartments C C. In the front end of the upper compartment is the lens $a$, (see dotted lines, Figs. 1 and 2,) of the usual or any suitable construction, and which may have behind it within the box an automatic shutter of the usual or any suitable construction. About half-way of the upper compartment, or at a suitable focussing distance from the lens, is a vertical groove $b$ on each inner side of the box to receive and retain the side edges of a dry-plate. Coincident with the grooves $b$ through the partition B is a transverse slot $c$, (see dotted lines, Fig. 1,) of sufficient width to permit the passage of a dry-plate from the lower compartment into the grooves $b$. Normally covering this slot, and resting upon the top of the partition B is a slide E, whose forward edge is confined under a strip F, secured upon the partition in front of the slot $c$. Secured to and extending up from the slide E are two presser-arms G, one near each end of the slide. Secured to and extending back from the slide E at its middle is a rod H, guided in a suitable bearing I and having at its rear end a flat plate $d$, resting on the partition and with its end bent up, as shown. From the plate $d$ a rod $e$ extends back through an aperture in the box and is provided on its outer end with a button or knob $f$. Surrounding the rod $e$ between the plate $d$ and the rear end of the box is a coiled spring $g$. If desired, the rods H and $e$ may be one, with a pin or collar to receive the forward end of the spring, as will be readily understood. The above constitutes the mechanism of the upper compartment of the box.

In a longitudinal groove in the bottom of the lower compartment is suitably journaled a fixed but revoluble screw J, whose rear end projects through the wall of the box and is provided with a turning-button $h$. Resting upon the bottom of the box or upon slides $i$ is a flat plate K, with its ends turned up to constitute a carrying-tray, having secured upon its under side a nut or nuts $j$, engaging the screw J, so that by turning the screw the tray is caused to travel from one end of the box to the other. Carried upon this tray and fitting snugly between its upturned ends is a rack-box L, open at its top, and containing in this instance twenty-two divisions for holding vertically as many dry-plates. When the rack-box is at the extreme forward end of the compartment, the rearmost dry-plate is directly under the slot $c$. One side of the box is shown hinged, so as to gain access to the interior, and in operation the box is taken into a dark-room, the rack-box removed and filled with dry-plates, and then put back into the tray, and the box reclosed. The camera is now ready for use. The operator first inverts the box and then draws back the rods $e$ and H, thereby pulling back the slide E and arms G and uncovering the slot $c$. As soon as the slot $c$ is uncovered the dry-plate drops by gravity through said slot into the grooves $b$ of the upper compartment, and the operator then releases the rods $e$ and H and the spring $g$ forces the slide E forward to re-cover the slot and to cause the arms G to press upon the rear side of the dry-plate to hold it steady.

The box is reversed, and the picture may now be taken whenever the operator is ready, and after it is taken the slide and arms G are again pulled back and the plate permitted to drop back through the slot c into its compartment in the rack-box. The screw J is then turned to bring the next dry-plate directly under the slot c, the box is again inverted, and the second plate is brought into position for exposure, and so on, as will be readily understood. By this construction the operator need not wait until all of the plates in the rack-box have been exposed, for at any time he may take the camera into the dark-room and remove the rack-box to extract as many of the exposed dry-plates as he may wish.

In Fig. 4 I have shown the camera provided with a focusing-lens M, and in this construction a ground-glass plate N is secured to the slide E and uprights G, and the rear wall of the box has a peep-hole k, normally covered by a cap l, to enable the operator to properly focus his lens upon the ground glass before a dry-plate is put into position for exposure.

I have shown one side of the rack-box provided with numbers, which show through an aperture m in the side of the box, to enable the operator to properly adjust the dry-plates successively under the slot c. The aperture m should be covered by a thin red-glass plate to prevent actinic action, as will be readily understood.

By the above means I provide a very simple, compact, and efficient camera.

Having thus fully described my invention, I claim—

1. The combination, in a camera-box divided into an upper and lower compartment, of a removable rack-box, a sliding tray for the same, a fixed revoluble screw engaging said tray, and a slide carrying presser-arms for covering and uncovering a slot in the division-piece and for holding a dry-plate in position for exposure, substantially as described.

2. The combination, in a camera-box having a focusing-lens and divided into an upper and lower compartment, of a removable rack-box, a sliding tray for the same, a fixed revoluble screw engaging said tray, and a slide carrying presser-arms and a focusing-glass for covering and uncovering a slot in the division-piece and for holding a dry-plate in position for exposure, substantially as described.

3. In a camera, the combination, with a fixed revoluble screw and a sliding tray operated thereby, of a rack-box for the dry-plates carried by said tray and having index-marks upon its side to register with an aperture in the box, substantially as described.

4. The combination and arrangement of the screw J, nut j, tray K, rack-box L, partition B, with its slot c, strip F, slide E, with its presser-arms G, and operating-rod H e, with its spring g, substantially as and for the purpose described.

HARRY M. ALTICK.

Witnesses:
CARL BAUMANN,
CONSTANTIN BLESSINGER.